No. 794,422. PATENTED JULY 11, 1905.
F. A. NELSON.
GRASS CUTTER.
APPLICATION FILED JULY 27, 1904.
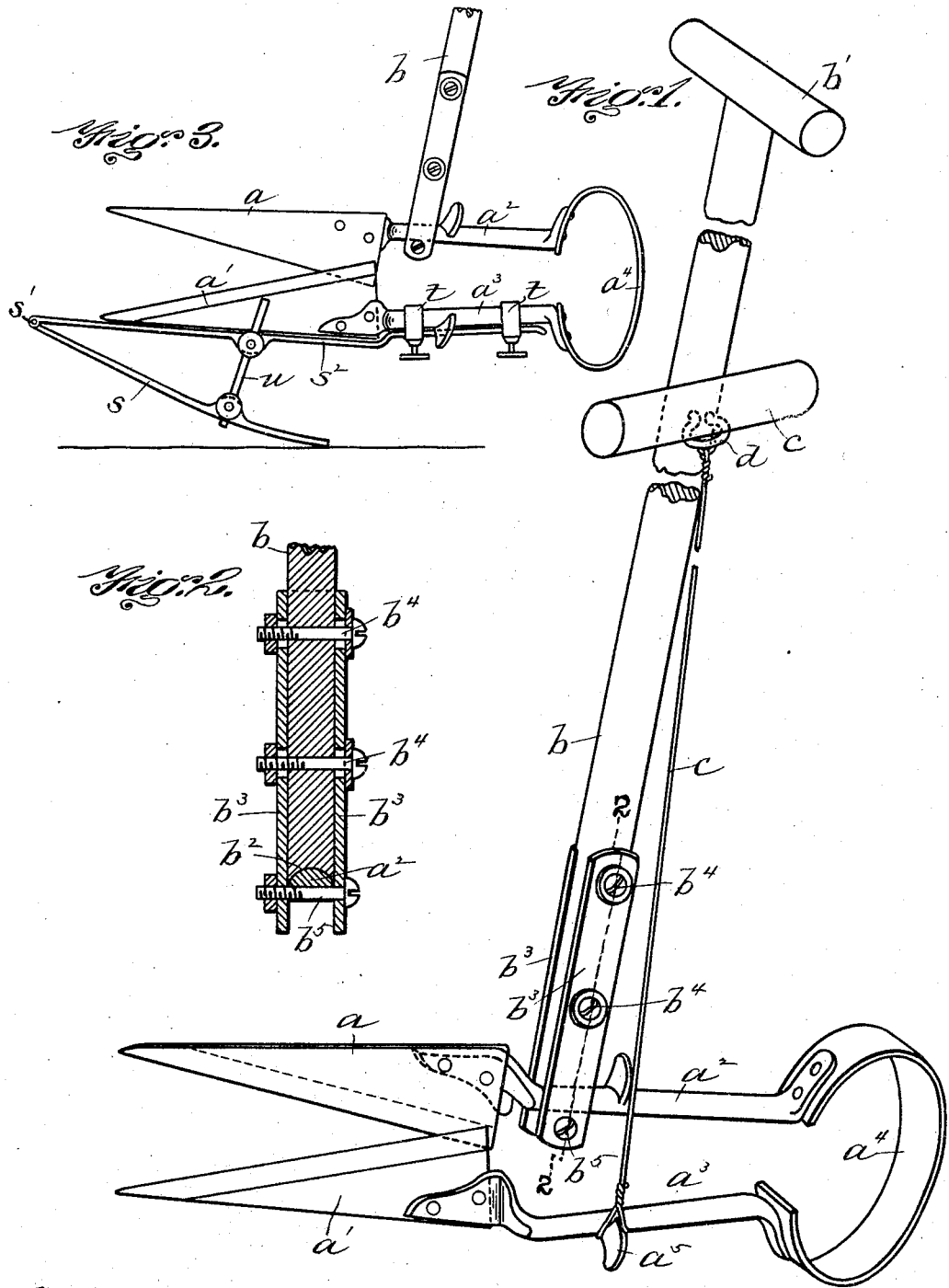
Witnesses:
Inventor:
F. A. Nelson No. 794,422. Patented July 11, 1905.

UNITED STATES PATENT OFFICE.

FRANK A. NELSON, OF WAKEFIELD, MASSACHUSETTS.

GRASS-CUTTER.

SPECIFICATION forming part of Letters Patent No. 794,422, dated July 11, 1905.

Application filed July 27, 1904. Serial No. 218,423.

*To all whom it may concern:*

Be it known that I, FRANK A. NELSON, of Wakefield, in the county of Middlesex and State of Massachusetts, have invented certain new and useful Improvements in Grass-Cutters, of which the following is a specification.

This invention has for its object to provide a simple, effective, and relatively inexpensive device for trimming the edges of lawns, particularly along walks and driveways; and it consists in the improvements which I will now proceed to describe and claim.

Of the accompanying drawings, forming a part of this specification, Figure 1 represents a perspective view of a grass-cutter embodying my invention. Fig. 2 represents a section on line 2 2 of Fig. 1. Fig. 3 represents a side view showing an attachment for supporting the shears in a raised position.

The same reference characters indicate the same parts in all the figures.

In the drawings, $a$ and $a'$ represent the blades of a pair of ordinary grass-cutting shears, said blades having the usual shanks $a^2$ $a^3$, which are connected by a bow-spring $a^4$. The spring normally opens the shears or tends to separate the blades $a$ $a'$.

$b$ represents an elongated staff or rod which is or may be provided at its upper end with a handle $b'$. The lower end of the rod $b$ is provided with means whereby it may be detachably secured to the shank $a^2$ of the blade $a$. The said means, as here shown, comprise a seat $b^2$, formed on the lower end of the rod $b$ and fitting the upper side of the shank $a^2$, and metal plates $b^3$ $b^3$, secured by bolts $b^4$ to the rod $b$, the lower ends of said plates projecting below the seat $b^2$ and constituting jaws which bear against the opposite edges of the shank $a^2$ and are connected by a bolt $b^5$. When the nut on said bolt is tightened, the jaws are pressed against the edges of the shank $a^2$ and the rod $b$ is firmly engaged with the shears. The rod $b$ extends substantially in the plane of the cutting movement of the shear-blades, so that when it occupies a vertical position the blades will be in a substantially vertical plane, the lower blade resting on the ground. Downward pressure on the handle will therefore depress the upper blade and cause the two blades to coöperate in trimming grass from the border of a walk or drive. When the downward pressure on the rod is released, the spring $a^4$ raises the upper blade and the rod. The orifices in the plates $b^3$, through which the bolts $b^4$ pass, may be enlarged to permit the adjustment of the plates $b^3$.

$c$ represents an elongated rod which is preferably a piece of flexible wire affixed at one end to an ear $a^5$ on the shank $a^3$ and at its opposite end to a head or handle $c'$. The rod $c$ is adapted to pass through a guide $d$, affixed to the rod $b$, said guide being preferably an ordinary screw-eye. When the blades $a$ $a'$ are separated to the fullest extent desired, the head $c'$, bearing against the guide $d$, prevents further separation of the blades, so that the heels of the blades cannot be separated from each other. The rod $c$ and its head $c'$ also serve as a means for operating the shears when the nature of the work is such that the blade $a'$ cannot bear upon the ground.

It will be seen that the improved cutter as a whole is adapted to trim edges, borders, &c., without requiring the stooping of the operator. The rod $b$ and the plates $b^3$ thereto affixed constitute a simple and inexpensive attachment for a pair of ordinary grass-shears.

In Fig. 3 I show a shoe connected with the lower blade and adapted to bear on the ground and support the shears at any desired height above the ground. Said shoe is composed of an inner member $s^2$, which bears on the back of the lower blade, and an outer member $s$, which projects outwardly from said back. The member $s$ is hinged at $s'$ to the member $s^2$, which bears on the under side of the shank $a^3$ and is detachably secured to the said shank by clamps $t$ $t$. The member $s$ may be held at any desired inclination by an adjustable strut or brace $u$.

I claim—

1. A grass-cutter comprising a pair of shear-blades, a spring adapted to separate the blades, and a single elongated operating-rod rigidly connected with one of the blades and extending substantially at right angles with the back thereof, in the direction required to press the other blade against the ground and thus cause the closing of the blades.

2. A grass-cutter comprising a pair of shear-blades having spring-connected shanks, and a single elongated operating-rod formed at one end to bear on the back of the shank of the upper blade and having jaws projecting below said end to bear on the opposite edges of said shank, and a bolt connecting said jaws below the said shank.

3. A grass-cutter comprising a pair of shear-blades, a spring adapted to separate the blades, a single elongated operating-rod rigidly connected with the upper blade and extending substantially at a right angle with the back thereof, said rod being provided with an eye or guide, and an elongated rod connected with the lower blade and passing through said guide, the said rod having a head adapted to bear on the guide and limit the separation of the blades.

4. A grass-cutter comprising a pair of shear-blades having spring-connected shanks, an operating-handle engaged with the shank of the upper blade, and a supporting-shoe bearing on the back of the lower blade and projecting outwardly therefrom, said shoe being clamped to the shank of the lower blade.

5. A grass-cutter comprising a pair of shear-blades having spring-connected shanks, an operating-handle engaged with the shank of the upper blade, and a supporting-shoe composed of an inner member which is clamped to the shank of the lower blade and bears on the back of the said blade, an outer member hinged to the inner member, and a strut pivotally connected with the outer member and adjustably connected with the inner member.

In testimony whereof I have affixed my signature in presence of two witnesses.

FRANK A. NELSON.

Witnesses:
FRANK E. COX,
WM. R. BOWIE.